United States Patent [19]
Cross, Jr.

[11] 3,876,976
[45] Apr. 8, 1975

[54] TILT ACTUATED DIRECTIONAL SIGNAL FOR VEHICLES

[76] Inventor: Roger H. Cross, Jr., 927 Erie Station Rd., Rush, N.Y. 14543

[22] Filed: Jan. 17, 1974

[21] Appl. No.: 434,258

[52] U.S. Cl................................ 340/73; 340/134
[51] Int. Cl.......................... B60q 1/34; B62j 5/00
[58] Field of Search .............. 340/55, 56, 73, 134

[56] References Cited
UNITED STATES PATENTS

| | | | |
|---|---|---|---|
| 2,302,098 | 11/1942 | Birk et al. | 340/55 UX |
| 2,432,388 | 12/1947 | Curtiss | 340/73 X |
| 3,778,763 | 12/1973 | Johns et al. | 340/55 |

Primary Examiner—Donald J. Yusko

[57] ABSTRACT

A directional signalling system for transportation vehicles, such as motorcycles, in which a manually-initiated turn signal is automatically cancelled by means of a device responsive to changes in the gravitational and inertial forces experienced by the vehicle due to inclination from its normally upright position or due to alteration of its direction of motion.

7 Claims, 1 Drawing Figure

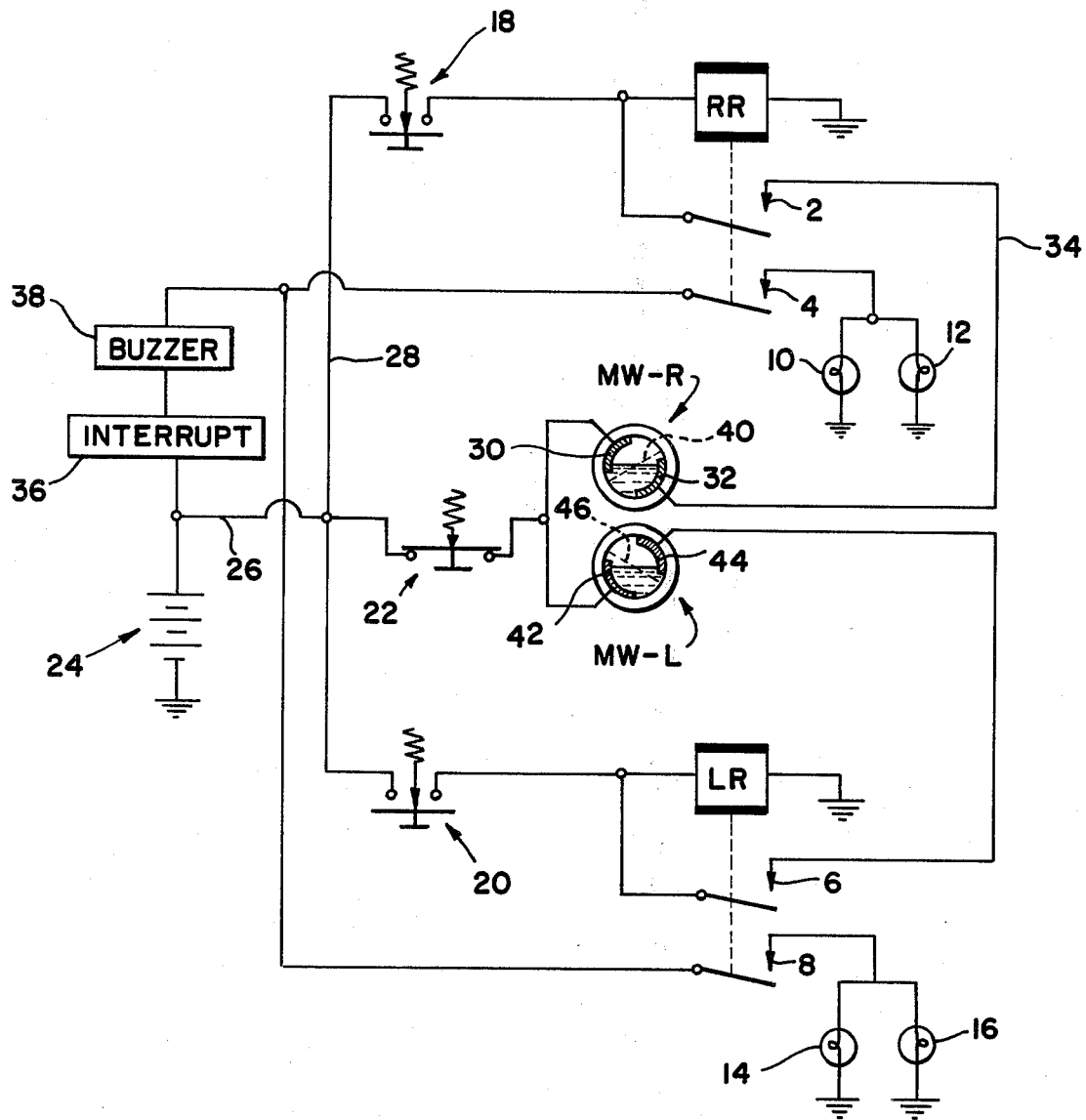

TILT ACTUATED DIRECTIONAL SIGNAL FOR VEHICLES

This application relates to directional signals for vehicles and, more particularly, to turn signals which are automatically cancelled after the turn is actually initiated or completed.

BACKGROUND

Most automotive vehicles utilize turn signals which can be selectively activated by the operator to indicate a direction in which he intends to turn. Such signals are usually in the form of flashing light units or movable pointer arms and are controlled by switches sensitive to the turning of the steering wheel of the vehicle, the indicator unit remaining in its activated signalling condition until the steering wheel is turned through an arc substantially greater than that normally experienced for maintaining a generally straight path of movement. These well-known signalling systems cannot be efficiently utilized by certain small transportation vehicles, such as motorcycles, in which turning is accomplished by relatively small angular movements of the steering mechanism. That is, the switching devices which are responsive to substantially large angular movements of the steering mechanism to cancel the directional signal indications do not respond to the relatively small angular movements used to turn a motorcycle.

BRIEF SUMMARY

The invention herein provides a signalling system which automatically cancels the turn signals after a turn is initiated or completed even though the operator at no time makes a substantial movement of the steering mechanism.

This is accomplished by utilizing a device which is responsive to changes in gravitational and inertial forces. This inertial device includes an element, such as liquid mercury, which can be moved from a normal "at rest" position by substantial changes in such forces. Such a change of forces is experienced by a moving vehicle whenever direction of motion is substantially altered. For motorcycles, in addition to the inertial effect experienced as a result of a change in direction, a change in gravitational forces is experienced due to the inclination of the vertical axis of the vehicle from its normally upright position, such inclination being a normal and necessary adjunct to every substantial alteration in the course of the vehicle.

In the preferred embodiment disclosed, the signalling units are flashing lights controlled by appropriate electrical circuitry. The circuit includes "left" and "right" switches which can be selectively depressed by the operator to initiate flashing of the appropriate signal light. The inertial device is a mercury-wetted switch which is normally closed when the vehicle is in an upright position and traveling in a relatively straight course but which is opened by the relative movement of the mercury in the switch in response to changes in the gravitational and inertial forces experienced when the vehicles makes a substantial alteration of course. The opening of the mercury-wetted switch results in the deactivation of the flashing directional signal.

The preferred form of the invention also includes an audio signal for indication to the operator that the signaling units are in an activated condition as well as an "abort" switch which can be operated to cancel the turn signals manually.

DRAWING

The invention will now be described in greater detail with reference being made to the accompanying drawing which is a schematic circuit diagram of the preferred embodiment of apparatus for carrying out this invention.

DETAILED DESCRIPTION

The primary elements of the circuit are signal control relays RR and LR having, respectively, front contacts 2, 4, and 6, 8, and a pair of mercury-wetted switches MW-R and MW-L, as well as right turn signal lights 10, 12 and left turn signal lights 14, 16.

Signal operation is initiated by the closing of either right turn switch 18 or left turn switch 20 both of which are "normally-open," while "abort" switch 22 can be used for manual cancellation of turn signals.

The operation of this simple circuit is as follows: Assuming the motorcycle operator desires to indicate his intention to make a right turn, he first depresses spring-biased switch 18 closing a circuit from the positive side of battery 24, through lines 26 and 28, and switch 18 to the coils of right turn control relay RR. This energizes relay RR, lifting its armature and closing front contacts 2 and 4 which in turn close, respectively, circuits for "sticking" relay RR in its picked-up position and for energizing the right turn signal lights 10, 12.

The "stick" circuit for relay RR can be traced from the positive side of battery 24, through line 26, the contacts of normally-closed switch 22, upper contact 30 and lower contact 32 of mercury-wetted switch MW-R, line 34, front contact 2, and the coils of relay RR. At the same time, right turn signal lights 10, 12 are energized by the closing of the circuit from the positive side of battery 24 through interrupt 36, buzzer 38, and front contact 4. Interrupt 36 is merely a conventional and well-known "flasher" unit which successively opens and closes the last-described circuit to cause the production of an intermittent audio signal by buzzer 38 and the intermittent flashing of right turn lights 10, 12.

It will be noted that the operator can immediately release normally-open switch 18, opening its contacts, and signal control relay RR remains in its picked-up position by virtue of the "stick" circuit just described above.

Relay RR remains picked-up and signal lights 10, 12 remain in their activated flashing condition until the gravitational and inertial forces acting on the motorcycle cause the relative movement of the mercury in mercury-wetted switch MW-R so that the surface of the mercury moves to the general position indicated by dotted line 40, effectively opening the electrical connection between upper contact 30 and lower contact 32. This de-energizes control relay RR opening contacts 2 and 4 and, thereby, deactivating signal lights 10, 12.

It can be seen that the momentary closing of normally-open "left turn" switch 20 will similarly cause the energization of control relay LR closing its front contacts 6 and 8, in turn activating flashing signal lights 14, 16 and the "stick" circuit for relay LR through lower contact 42 and uppper contact 44 of mercury-wetted switch MW-L. In the same manner as has been described above, control relay LR remains in its picked-up position and signal lights 14, 16 continue to flash until the turning of the vehicle causes the mercury level in switch MW-L to move relatively to the position indicated by dotted line 46. This breaks the electrical connection between contacts 42 and 44, opening the "stick" circuit to de-energize relay LR and, thereby, opening front contacts 6 and 8 and deactivating flashing lights 14, 16.

It will be noted that both directional switches 18 and 20 can be closed to provide the vehicle with conventional "emergency" signals. Also, the operation of either or both sets of directional lights can be manually cancelled by the momentary depression of abort switch 22. It can be seen that this provides a manually operable means for opening the stick circuits to the control relays even though the mercury of the inertial switches remains in its normal "at rest" position making electrical connection between their respective contacts.

It will be appreciated that the switches MW-R and MW-L may be replaced with any other type of inertially sensitive switch including a movable element having a normal "at rest" position, in which it provides a normally closed electrical circuit, the element being responsive to changes in vertical position or inertial force to move relatively to a position opening said electrical connection.

Similarly, it will be appreciated that the entire signalling unit could be mechanical in nature, comprising directional arms movable manually against spring bias to a temporary position indicating a directional change, with inertially sensitive latching means which can be released in response to changes in gravitational or centrifugal forces to unlatch the pointer and permit it to return under the spring bias to its normally deactivated position.

What is claimed is:

1. In a directional signalling system for a transportation vehicle, said system including
   at least two electrically-operable signalling units which can be selectively activated by the closing of electrical circuit means to indicate the intended turning of the vehicle in each of two respective directions,
   electric switch means for closing said electric circuit means to selectively activate said signalling units, and
   cancellation means for automatically deactivating the signalling units at some time after the vehicle has initiated a change of course in the intended direction,
   the improvement wherein
   said automatic cancellation means comprises an inertial device having an element relatively movable from a normal "at rest" position in response to substantial changes in gravitational and inertial forces experienced by the vehicle due to the inclination of its vertical axis from its normal upright position or due to an alteration in its direction of motion,
   said signalling units being deactivated by the opening of said electrical circuit means in response to the movement of said element of the inertial device from said normal "at rest" position.

2. A directional signalling system according to claim 1 wherein said electrically operated signalling units are lights.

3. A directional signalling system according to claim 1 wherein said circuit means comprises relay means selectively activated by operation of one of said switches
   for closing a first circuit to supply electrical power to a respective one of said signalling units and
   for closing a second circuit to supply electrical power to maintain the activation of said relay means, said second circuit being opened whenever the movable element of the inertial device is moved away from said "at rest" position.

4. A directional signalling system according to claim 1 wherein said inertial device is a mercury-wetted switch, the movable element thereof being liquid mercury.

5. A directional signalling system according to claim 1 further comprising interrupter means for successively energizing and de-energizing said signalling units whenever said units are activated.

6. A directional signalling system according to claim 1 further comprising manually operable means for opening said circuit to deactivate the signalling units.

7. A directional signalling system according to claim 1 further comprising audio means for providing an audio signal whenever said signalling units are activated.

* * * * *